United States Patent
Higgins

(10) Patent No.: US 8,156,043 B1
(45) Date of Patent: Apr. 10, 2012

(54) SYSTEMS AND METHODS FOR A PREPAID INTEREST CREDIT CARD ACCOUNT

(75) Inventor: Andrew Jerome Higgins, San Antonio, TX (US)

(73) Assignee: United Services Automobile Assocation (USAA), San Antonio, TX (US)

( * ) Notice: Subject to any disclaimer, the term of this patent is extended or adjusted under 35 U.S.C. 154(b) by 726 days.

(21) Appl. No.: 12/251,679

(22) Filed: Oct. 15, 2008

(51) Int. Cl.
*G06Q 40/00* (2012.01)

(52) U.S. Cl. .................. 705/39; 705/35; 705/38; 705/40

(58) Field of Classification Search .................... 705/35, 705/38, 39, 40
See application file for complete search history.

(56) References Cited

U.S. PATENT DOCUMENTS

| | | | | |
|---|---|---|---|---|
| 5,945,653 | A * | 8/1999 | Walker et al. | 235/380 |
| 6,021,397 | A | 2/2000 | Jones et al. | |
| 7,672,901 | B1 | 3/2010 | Bent et al. | |
| 7,672,902 | B1 | 3/2010 | Bent et al. | |
| 7,702,547 | B2 * | 4/2010 | Kalra et al. | 705/34 |
| 2001/0042785 | A1 | 11/2001 | Walker et al. | |
| 2003/0101131 | A1 * | 5/2003 | Warren et al. | 705/38 |
| 2004/0117302 | A1 | 6/2004 | Weichert et al. | |
| 2005/0071205 | A1 * | 3/2005 | Terlizzi et al. | 705/4 |
| 2005/0240521 | A1 | 10/2005 | Fuentes-Torres | |
| 2006/0129480 | A1 | 6/2006 | Tabb | |
| 2007/0194107 | A1 * | 8/2007 | Aigbogun | 235/380 |
| 2007/0210150 | A1 | 9/2007 | Winking et al. | |
| 2008/0109378 | A1 * | 5/2008 | Papadimitriou | 705/36 R |
| 2008/0126267 | A1 * | 5/2008 | Rosen et al. | 705/36 R |

FOREIGN PATENT DOCUMENTS

KR 2008009356 A * 1/2008 ................. 705/35

OTHER PUBLICATIONS

Morse, Jane. "Penny-Wise Traveler; Credit Cards Can Be Handy for Travelers; The Money Game: Options and Ploys". Boston Globe. Boston, Mass.: Apr. 3, 1983. p. 1 (3 pages).*

Rhine, Sherrie L. W. et al.: "Cardholder Use of General Spending Prepaid Cards: A Closer Look at the Market", The Center for Financial Services Innovation, An Affiliate of ShoreBank Corporation, Feb. 2007, 22 pages.

* cited by examiner

*Primary Examiner* — Elda Milef
(74) *Attorney, Agent, or Firm* — Brooks, Cameron & Huebsch, PLLC

(57) ABSTRACT

A system for charging fees to a card holder of a credit card account may comprise at least one subsystem that calculates a prepaid interest amount and at least one subsystem that charges the prepaid interest amount to the credit card account in lieu of charging interest on the actual balance of the account.

18 Claims, 4 Drawing Sheets

SYSTEMS AND METHODS FOR A PREPAID INTEREST CREDIT CARD ACCOUNT

CROSS REFERENCE TO RELATED APPLICATIONS

The patent applications below (including the present patent application) are filed concurrently and share a common title and disclosure, each of which is hereby incorporated herein by reference in its entirety:
U.S. patent application Ser. No. 12/251,693; and
U.S. patent application Ser. No. 12/251,703.

BACKGROUND

Credit card holders are influenced to pay off their monthly balance in order to avoid interest fees, which in turn limits interest based revenue. However, many credit card holders may choose to carry a balance if the economic incentives were available. Lacking credit card holders that carry balances month-to-month results in lost fees and interest to credit card companies. Currently, many credit cards charge an annual fee, but this fee is not tied to any interest rate or credit limit on the credit card account. Thus, this fee is the same for all card holders regardless of their credit limit and provides little incentive for credit card holders to carry a balance.

In this regard, there is a need for systems and methods that overcome shortcomings of the prior art.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for prepaid interest credit card account are provided. For several embodiments, a system for charging fees to a card holder of a credit card account may comprise at least one subsystem that calculates a prepaid interest amount and at least one subsystem that charges the prepaid interest amount to the credit card account in lieu of charging interest on the actual balance of the account.

Other features and embodiments are described below.

BRIEF DESCRIPTION OF THE DRAWINGS

Systems methods for a prepaid interest credit card account are further described with reference to the accompanying drawings in which.

DETAILED DESCRIPTION

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Figure 1:
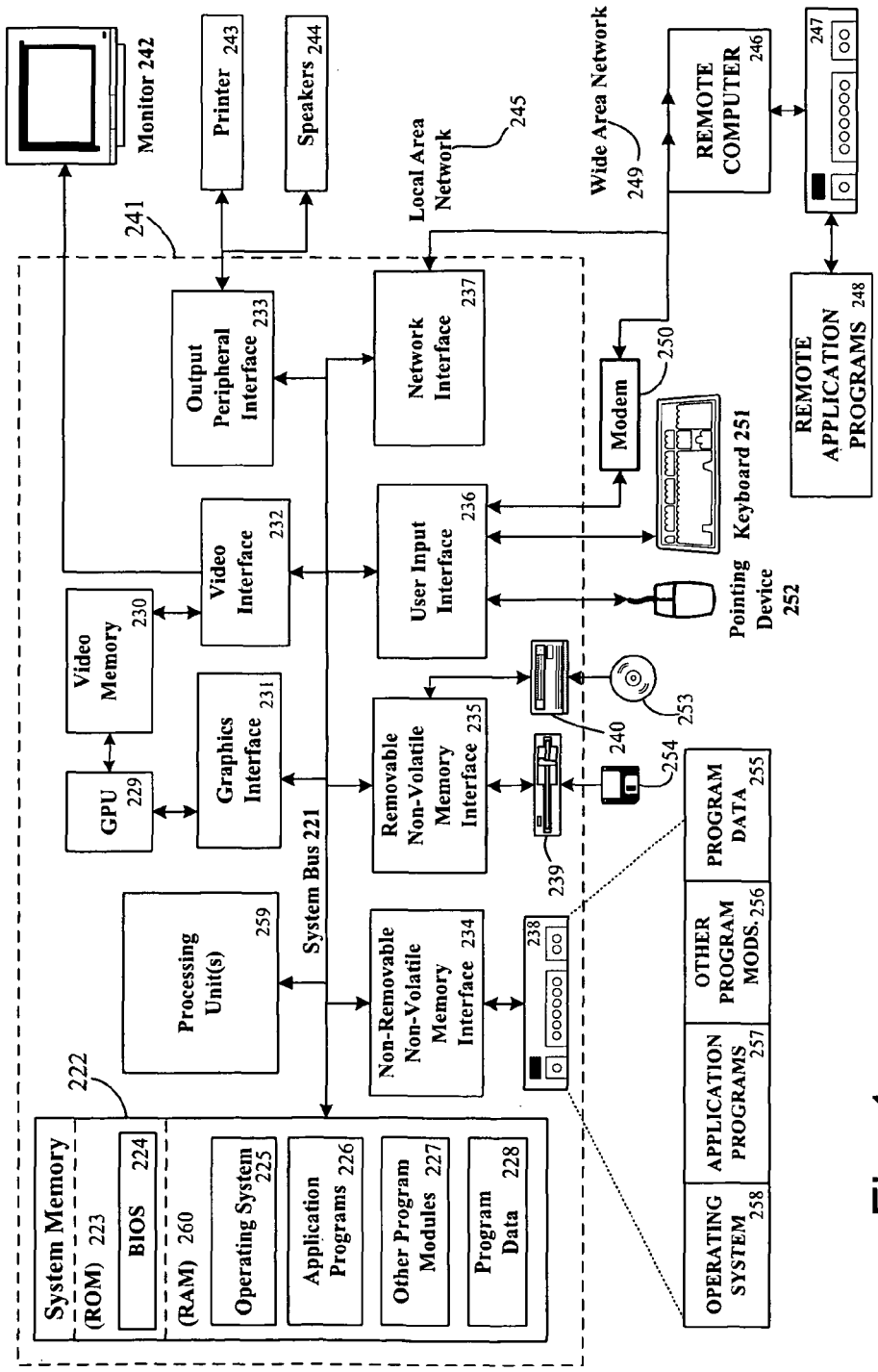
FIG. 1 is a block diagram representing an exemplary computing device suitable for use in conjunction with implementing systems and methods for a prepaid interest credit card account.

Referring next to FIG. 1, shown is a block diagram representing an exemplary computing device suitable for use in conjunction with implementing the processes described below. For example, the computer-executable instructions that carry out the processes and methods for a prepaid interest credit card account may reside and/or be executed in such a computing environment as shown in FIG. 1. The computing environment 220 is only one example of a suitable computing environment and is not intended to suggest any limitation as to the scope of use or functionality of the embodiments. Neither should the computing environment 220 be interpreted as having any dependency or requirement relating to any one or combination of components illustrated in the exemplary computing environment 220. For example a computer game console may also include those items such as those described below for use in conjunction with implementing the processes described below.

Aspects of the embodiments are operational with numerous other general purpose or special purpose computing environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the embodiments may be implemented in the general context of computer-executable instructions, such as program modules, being executed by a computer. Generally, program modules include routines, programs, objects, components, data structures, etc. that perform particular tasks or implement particular abstract data types. Aspects of the embodiments may also be practiced in distributed computing environments where tasks are performed by remote processing devices that are linked through a communications network. In a distributed computing environment, program modules may be located in both local and remote computer storage media including memory storage devices.

An exemplary system for implementing aspects of the embodiments includes a general purpose computing device in the form of a computer 241. Components of computer 241 may include, but are not limited to, a processing unit 259, a system memory 222, a graphics interface 231, a graphics processing unit (GPU), video memory 229, and a system bus 221 that couples various system components including the system memory 222 to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and include both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared and other wireless media. Combinations of the any of the above should also be included within the scope of computer readable media.

The system memory 222 includes computer storage media in the form of volatile and/or nonvolatile memory such as ROM 223 and RAM 260. A basic input/output system (BIOS) 224, containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 1 provide storage of computer readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device 247. By way of example, and not limitation, FIG. 1 illustrates remote application programs 248 as residing on the remote memory storage device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the embodiments, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the embodiments. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the embodiments, e.g., through the use of an application programming interface (API), reusable controls, or the like. Such programs are preferably implemented in a high level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the embodiments in the context of one or more stand-alone computer systems, the embodiments are not so limited, but rather may be implemented in connection with any computing environment, such as a network or distributed computing environment. Still further, aspects of the embodiments may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2:
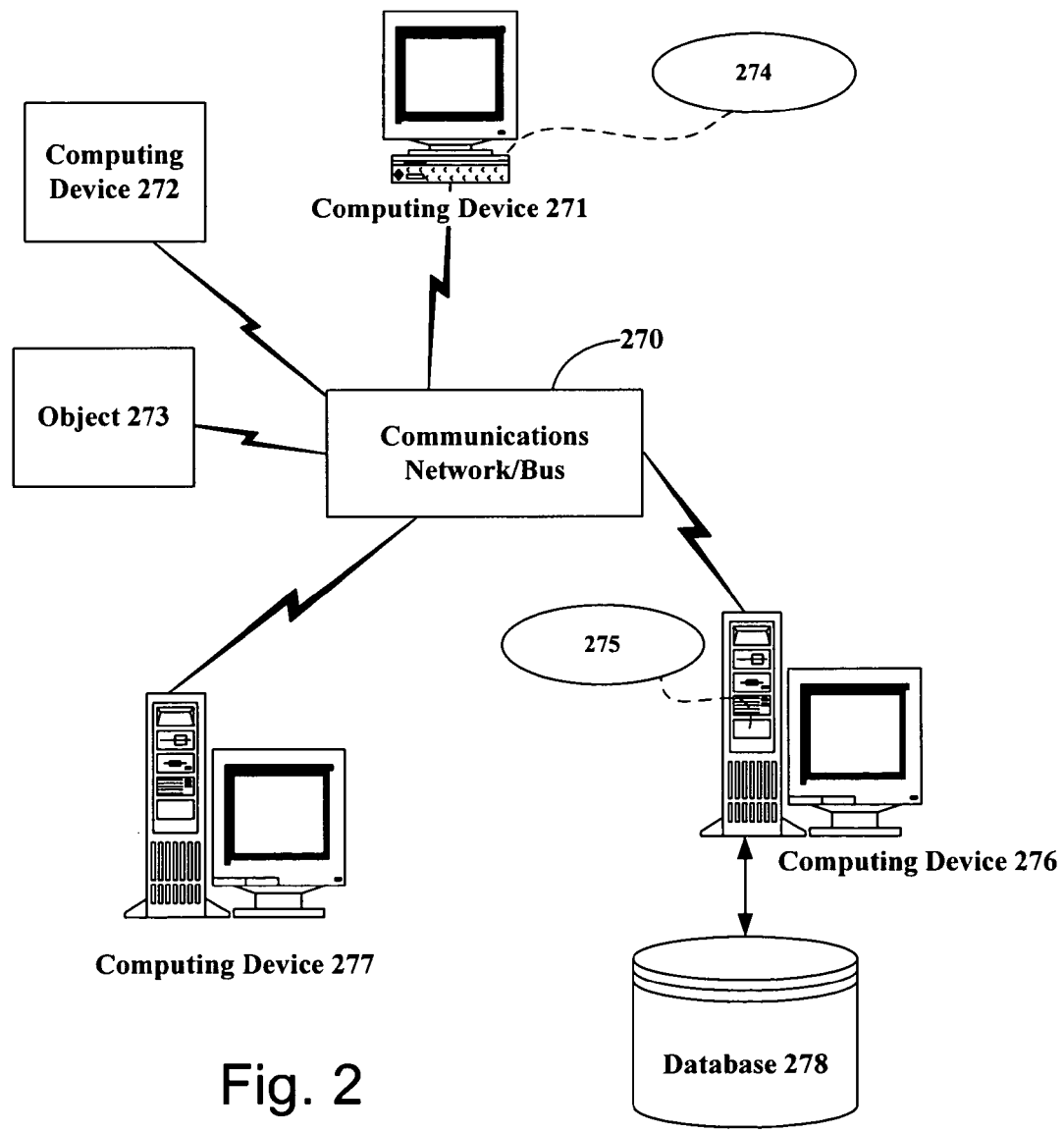
FIG. 2 illustrates an exemplary networked computing environment in which many computerized processes may be implemented to perform providing a prepaid interest credit card account.

Referring next to FIG. 2, shown is an exemplary networked computing environment in which many computerized processes may be implemented to perform the processes described below. For example, parallel computing may be part of such a networked environment with various clients on the network of FIG. 2 using and/or implementing a prepaid interest credit card account. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2, and may itself represent multiple interconnected networks. In accordance with aspects of the embodiments, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture. Instead, the embodiments should be construed in breadth and scope in accordance with the appended claims.

A prepaid interest credit card account may involve charging a percentage of the annual interest on the credit limit amount on a credit card upfront and charge no further interest for the remainder of the year. Essentially this allows for a card holder to carry a balance from month to month with no additional interest charges. The card holder can continue with the annualized reduced interest plan or pay the balance amount off at the end of the year. This gives card holders the ability to manage their available capital more fluidly and simplifies the interest process.

Figure 3:
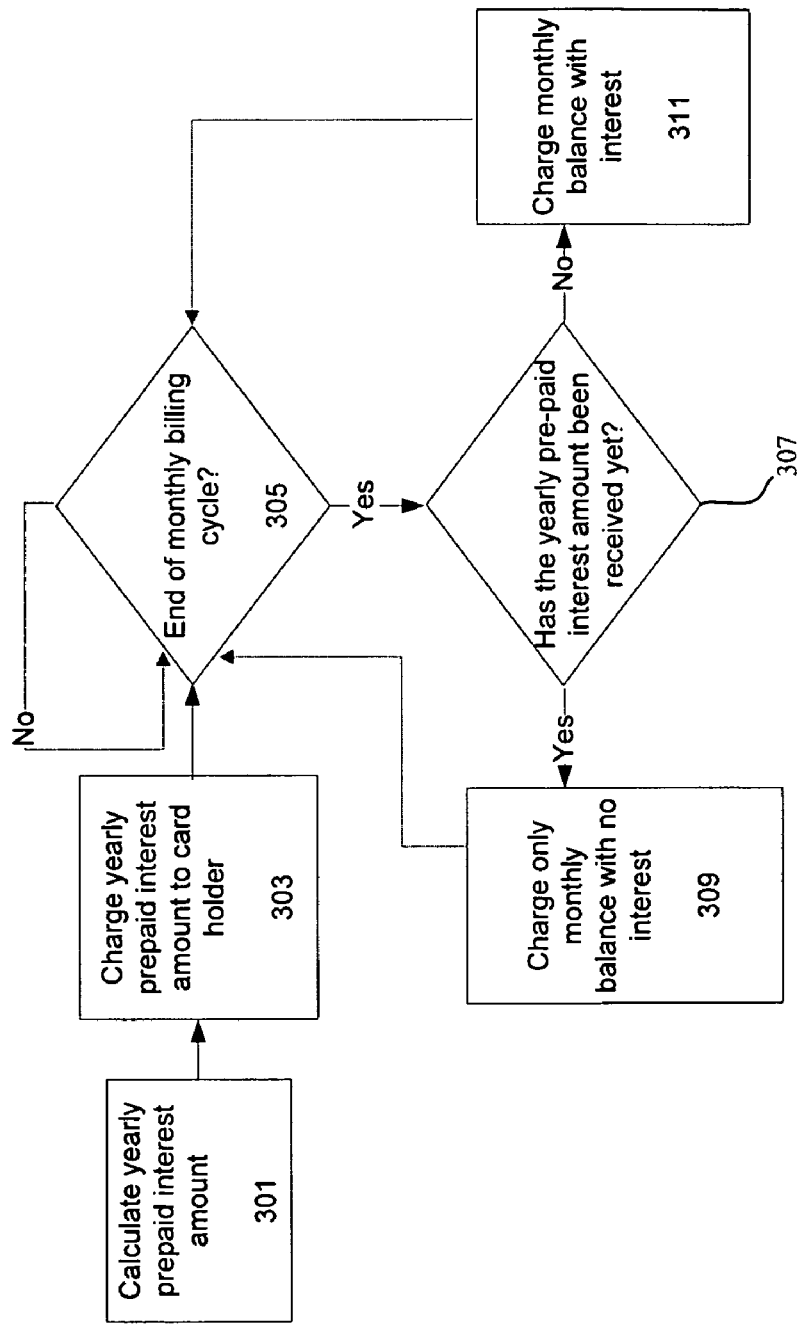
FIG. 3 is a flow chart illustrating an example process for a prepaid interest credit card account.

Referring next to FIG. 3, shown is a flow chart illustrating an example process for a prepaid interest credit card account. First, a prepaid interest amount is calculated 301. For example, this prepaid interest amount may be a percentage of the total interest amount on a credit card account should the card holder maintain a balance of the credit limit for an entire year. The percentage of interest amount and term may vary. For example, the term of the prepaid interest may be less or more than a year and the percentage amount may be >0% and <100%. As an example, if the total annual interest charged on the credit limit of the account is $2000 (i.e., the total amount of interest that would be charged should the customer hold a balance on the card equal to the credit limit for an entire year) and the percentage of interest to be prepaid is 50% of the annual interest on the credit limit, then the amount of prepaid interest amount is $1000 (50% of $2000).

If a card holder has opted in or signed up for a prepaid interest credit card account then the prepaid interest amount is charged (303) to the account of the card holder. It is then determined (305) whether it is the end of the monthly billing cycle. If it is not the end of the monthly billing cycle, then the process loops back until it is the end of the monthly billing cycle. If it is the end of the monthly billing cycle then it is determined 307 whether the prepaid interest amount has been received yet. If the payment has been received, then only the monthly unpaid balance is charged (309) with no interest. If the payment has not been received yet, then the unpaid monthly balance is charged (311) to the card holder with interest. The process then loops back to the determination (305) of whether the end of the monthly billing cycle has been reached.

Figure 4:
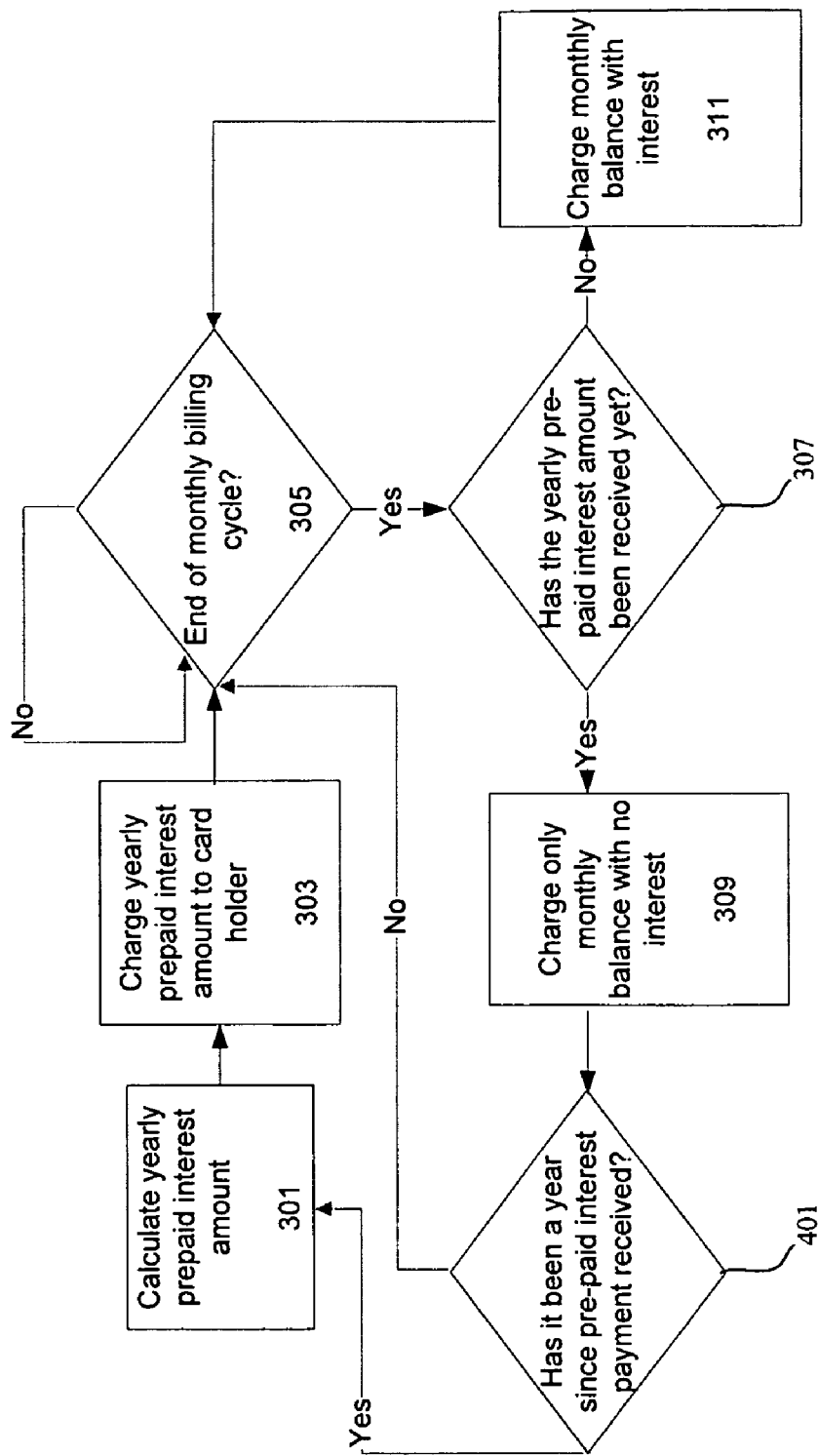
FIG. 4 is a flow chart illustrating an example process for a prepaid interest credit card account including year-end renewal of prepaid interest.

Referring next to FIG. 4, shown is a flow chart illustrating an example process for a prepaid interest credit card account including year-end renewal of prepaid interest. First, a prepaid interest amount is calculated 301 as described above. If a card holder has opted in or signed up for a prepaid interest credit card account then the prepaid interest amount is charged (303) to the account of the card holder.

It is then determined (305) whether it is the end of the monthly billing cycle. If it is not the end of the monthly billing cycle, then the process loops back until it is the end of the monthly billing cycle. If it is the end of the monthly billing cycle then it is determined 307 whether the prepaid interest amount has been received yet. If the payment has been received, then only the monthly unpaid balance is charged (309) with no interest. Then it is determined (401) whether it has been a year since the prepaid interest payment had been received. However, a year term is used herein as an example only and other lengths of time may also be used. If it has been a year since the yearly prepaid interest had been received, then the yearly prepaid interest amount is calculated (301) for the next year and is charged (303) to the card holder. As an alternative process, the card holder may at this point have a choice to opt out of the prepaid interest plan by making a positive indication of such or just by not paying the prepaid interest amount charged to their account. Also, if the end of the monthly billing cycle does not coincide with the year-long period since the prepaid interest had been received, then only the portion of the billing cycle falling within the year-long period will be covered by the prepaid interest received. The process then proceeds to the determination (305) of whether the end of the monthly billing cycle has been reached and continues as described above.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although embodiments been described herein with reference to particular means, and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A system for charging fees to a card holder of a credit card account comprising:
   a memory; and
   a number of processors configured to execute computer readable instructions stored in the memory to:
   calculate a prepaid interest amount comprising;
      define a term over which to calculate the prepaid interest;
      calculate what a total amount of interest charges on the credit card account would be over the defined term if the card holder were to carry a balance equal to a credit limit of the credit card account over the defined term;
      define the prepaid interest amount to be a portion of the calculated total amount of interest charges; and
   charge the prepaid interest amount to the credit card account in lieu of charging interest on the actual balance of the account.

2. The system of claim 1 wherein the term is equal to a year.

3. The system of claim 1 wherein the portion of the calculated total amount is 50% of the calculated total amount.

4. The system of claim 1 further comprising provide the card holder an option to start charging interest on the actual balance of the account instead of prepaid interest after a pre-determined term has expired.

5. The system of claim 4 wherein the pre-determined term is that which is used to calculate the prepaid interest amount.

6. The system of claim 4 further comprising charge the prepaid interest amount based on a current credit limit after the pre-determined term has expired if the card holder does not choose to opt out.

7. A computer implemented method for charging fees to a card holder of a credit card account comprising:
   using a number of processors to execute computer readable instructions for:
      calculating a prepaid interest amount comprising;
         defining a term over which to calculate the prepaid interest;

calculating what a total amount of interest charges on the credit card account would be over the defined term if the card holder were to carry a balance equal to a credit limit of the credit card account over the defined term;

defining the prepaid interest amount to be a portion of the calculated total amount of interest charges; and charging the prepaid interest amount to the credit card account in lieu of charging interest on the actual balance of the account.

8. The method of claim 7 wherein the term is equal to a year.

9. The method of claim 7 wherein the portion of the calculated total amount is 50% of the calculated total amount.

10. The method of claim 7 further comprising providing the card holder an option to start charging interest on the actual balance of the account instead of prepaid interest after a pre-determined term has expired.

11. The method of claim 10 wherein the pre-determined term is that which is used to calculate the prepaid interest amount.

12. The method of claim 10 further comprising charging the prepaid interest amount based on a current credit limit after the pre-determined term has expired if the card holder does not choose to opt out.

13. A non-transitory computer readable medium for charging fees to a card holder of a credit card account comprising:

computer readable instructions executable by a processor for:

calculating a prepaid interest amount comprising;

defining a term over which to calculate the prepaid interest;

calculating what a total amount of interest charges on the credit card account would be over the defined term if the card holder were to carry a balance equal to a credit limit of the credit card account over the defined term;

defining the prepaid interest amount to be a portion of the calculated total amount of interest charges; and charging the prepaid interest amount to the credit card account in lieu of charging interest on the actual balance of the account.

14. The computer readable medium of claim 13 wherein the term is equal to a year.

15. The computer readable medium of claim 13 wherein the portion of the calculated total amount is 50% of the calculated total amount.

16. The computer readable medium of claim 13 further comprising computer readable instructions for providing the card holder an option to start charging interest on the actual balance of the account instead of prepaid interest after a pre-determined term has expired.

17. The computer readable medium of claim 16 wherein the pre-determined term is that which is used to calculate the prepaid interest amount.

18. The computer readable medium of claim 16 further comprising computer readable instructions for charging the prepaid interest amount based on a current credit limit after the pre-determined term has expired if the card holder does not choose to opt out.

* * * * *